(12) United States Patent
Briemle et al.

(10) Patent No.: US 7,219,119 B2
(45) Date of Patent: May 15, 2007

(54) PROCEDURE FOR COMPUTING THE CHOLESKY DECOMPOSITION IN A PARALLEL MULTIPROCESSOR SYSTEM

(75) Inventors: Eugen Briemle, Laupheim (DE); Hans-Peter Keller, Boll (DE)

(73) Assignee: EADS Deutschland GmbH, Ottobrunn (DE)

( * ) Notice: Subject to any disclaimer, the term of this patent is extended or adjusted under 35 U.S.C. 154(b) by 724 days.

(21) Appl. No.: 10/461,867

(22) Filed: Jun. 16, 2003

(65) Prior Publication Data

US 2004/0034475 A1 Feb. 19, 2004

(30) Foreign Application Priority Data

Jun. 14, 2002 (EP) .................................. 02013112

(51) Int. Cl.
*G06F 7/32* (2006.01)
(52) U.S. Cl. ...................................... 708/520
(58) Field of Classification Search ............... 708/520, 708/200, 490
See application file for complete search history.

(56) References Cited

U.S. PATENT DOCUMENTS

| | | | | |
|---|---|---|---|---|
| 5,392,429 A | * | 2/1995 | Agrawal et al. | 708/446 |
| 5,442,569 A | * | 8/1995 | Osano | 716/20 |
| 5,841,473 A | * | 11/1998 | Chui et al. | 348/390.1 |
| 6,205,533 B1 | * | 3/2001 | Margolus | 712/13 |
| 6,397,236 B1 | * | 5/2002 | Garg et al. | 708/446 |
| 6,636,828 B1 | * | 10/2003 | Hachiya | 708/446 |
| 6,907,513 B2 | * | 6/2005 | Nakanishi | 708/520 |

OTHER PUBLICATIONS

Edward Rothberg, Performanceof Panel and Block Approaches to Sparse Cholesky Factorization on the iPSC/860 and Paragon Multicomputers, IEEE, 1994, pp. 324-332.*

*Computers and Structures*, Pergamon Press, GB, vol. 56, No. 1, Jul. 3, 1995, pp. 25-38 entitled "Parallel Cholesky Method on MIMD With Shared Memory" by D. Zheng et al.

*Proceedings of the Siam Conference on Parallel Processing for Scientific Computer*, 1995, pp. 407-412 entitled "Efficient Parallel Sparse Cholesky Factorization" by E. Rotheberg et al.

*Proceedings of the IASTED International Conference*, Aug. 21-24, 2001, pp. 419-424 entitled "Parallel Looping Algorithms for Cholesky Decomposition" by P-Y P. Chu et al.

* cited by examiner

*Primary Examiner*—Meng-Al T. An
*Assistant Examiner*—Chat C. Do
(74) *Attorney, Agent, or Firm*—Crowell & Moring LLP

(57) ABSTRACT

The invention relates to a procedure for computing the Cholesky decomposition of a positive definite matrix into a product of a lower and an upper triagonal matrix having a dimension of L in a multi-channel procedure, wherein:

the computation is performed in a parallel multi-processor system comprising a number P of processor modules;

each processor module p computes the entries of a set R of rows of the lower triagonal matrix with R=L/P, whereby a given row j is assigned to a processor module p such that $j=p+(r-1)\cdot P$ with $r=1, \ldots, R$ and $p=1, \ldots, P$;

the entries of the lower triagonal matrix are obtained by means of an iteration process over the columns i, with $i=1, \ldots, L$, whereby in each iteration step each processor module computes the entries of column i for its assigned rows R;

with beginning an iteration step for computing the entries of column i with $i \leq L$, the processor module to which the computation of row number i is assigned to stores its values of row i for access by the other processor modules.

1 Claim, 1 Drawing Sheet

PROCEDURE FOR COMPUTING THE CHOLESKY DECOMPOSITION IN A PARALLEL MULTIPROCESSOR SYSTEM

BACKGROUND AND SUMMARY OF THE INVENTION

This application claims the priority of European Application No. 02 013 112.4, filed Jun. 14, 2002, the disclosure of which is expressly incorporated by reference herein.

The invention relates to a procedure for computing the Cholesky decomposition in a parallel multi-processor system.

Hermitian, positive definite matrices can be factored into the product of a lower and an upper triagonal matrix such that the upper triangular factor is the hermitian conjugate of the lower factor:

$$C = L \cdot L^H.$$

The same holds for real symmetric matrices for which the hermitian conjugate operation H has to be replaced by the transpose operation T.

Such a decomposition is called "Cholesky decomposition".

The Cholesky decomposition enables and simplifies processing tasks that involve hermitian, positive definite matrices considerably. Examples are signal processing procedures, in particular multi-channel procedures such as in modern radar and communication systems.

In modern multi-channel radar systems, adaptive filter procedures such as Space-Time-Adaptive Processing (STAP) are used. As extended signal bandwidth and operational tasks for such systems result in increased dimensions of the related data structures and, hence, of the size of the associated data covariance matrices, there is a fast growing computational load related to such procedures and hence a need for simplifications in order to lower the load. One way to reduce this load is a suitable decomposition of the covariance matrix. In "Real-time STAP techniques", Electronic & Communication Engineering Jornal, February 1999, pp. 13–24, A. Farina and L. Timmoneri suggest that the Cholesky decomposition is an attractive way to decompose such matrices.

So far, the only known implementation schemes for the Cholesky decomposition are based on single processor architectures, an approach which, for high matrix dimensions, requires a very large single processor which is not available, too expensive or too big. On the other hand, Cholesky decomposition is generally one step in a sequence of sub-processing procedures within some bigger processing task.

In many applications in signal and data processing, the associated computational load is such that it requires the utilization of multi-processor. The whole computation process can usually be decomposed into sub-tasks some of which can be implemented in a straightforward manner in such a way that the processors work fully in a parallel manner. Such a fully parallel implementation is not feasible for the Cholesky decomposition. It is known from the computation rule for the entries of the Cholesky factors L, that all computed output values of the different steps are required by subsequent processing steps at some later instance. Hence, a full parallel assignment to different processing units of a multi-processor system in the sense that each processor unit computes some assigned part of the final result fully independently of the results of the other units is not feasible.

Nevertheless, a procedure is needed to utilize a multi-processing architecture for the computation of the Cholesky decomposition and to avoid the need for a powerful single processor in addition to the multi-processor system which is already available.

One object of the invention is to utlize the available processors in the multi-processor system in an effective way. Another object of the invention is, that throughout the computation process, the workload for the processor modules is balanced. Further, another object of the invention is to optimize the data exchange between the processor modules.

These goals are achieved by the invention decribed below. In particular, the goal is achieved by the disclosed procedure for computing the Cholesky decomposition in a parallel multi-processor system comprising a number P of processor modules, whereby the process comprises the following steps:

each processor module p computes the entries of a set R of pre-assigned rows of the lower triagonal matrix factor with R=L/P, whereby a given row j is assigned to a processor module p such that j=p+(r−1)·P with r=1, . . . , R and p=1, . . . , P and L×L being the dimension of the matrix;

the entries of the lower triagonal matrix are obtained by using an iteration process over the columns i, with i=1, . . . , L, whereby in each iteration step each processor module computes the entries of column i for its assigned rows R;

upon beginning an iteration step for computing the entries of column i with i≦L, the processor module to which the computation of row number i is assigned, stores its values of row i for access by the other processor modules.

According to the invention, the Cholesky decomposition is computed in a column-by-column manner, i.e. each new column is computed based on the entries of the previous columns. This can be seen from an expression for the computation of entry $a_{ji}$ which is given by $$a_{ji} = \|a_{i,i-1}\|^{-1} \cdot \left(c_{ij} - \sum_{k=1}^{i-1} a_{ik} \cdot a_{jk}^*\right) \quad (j \geq i) \tag{1}$$

where $c_{ij}$ is the corresponding value of the original matrix C and $\|a_{i,i-1}\|$ is the length of the row vector consisting of the already determined i−1 values of the $i^{th}$ row.

The expression for the computation of entry $a_{ji}$ (equation 1) is, up to a constant, given by $$a_{ji} = c_{ij} - \sum_{k=1}^{i-1} a_{ik} \cdot a_{jk}^*.$$

This requires (i−1) complex multiplications and (i−2)+1=i−1 complex additions and hence altogether 6·(i−1)+2·(i−1)=8·i−8 floating operations. This is the load for a single entry of column i. For this column, the determination of (L−i) entries and hence for the whole of this column with number i, $(L-i)\cdot(8\cdot i-8)=8\cdot(L-i)\cdot(i-1)=8\cdot[(L+1)\cdot i-i^2-L]$ floating operations is required. The total number of operations for the Cholesky decomposition of a L×L matrix is obtained by adding up these numbers for all of the L columns resulting in $$8\cdot\sum_{i=1}^{L}[(L+1)\cdot i - i^2 - L] = 8\cdot\left[(L+1)\cdot\frac{L\cdot(L+1)}{2} - \frac{L\cdot(L+1)\cdot(2\cdot L+1)}{6} - L^2\right] =$$

$$8\cdot\left(\frac{L\cdot(L^2+2\cdot L+1)}{2} - \frac{L\cdot(2\cdot L^2+3\cdot L+1)}{6} - L^2\right) = 8\cdot\left(\frac{L^3+2\cdot L^2+L}{2} - \frac{2\cdot L^3+3\cdot L^2+1}{6} - L^2\right)$$

$$8\cdot\left(\frac{L^3+2\cdot L^2+L}{2} - \frac{2\cdot L^3+3\cdot L^2+1}{6} - L^2\right) = 8\cdot\left(\frac{L^3}{6}-\frac{L^2}{2}+\frac{L}{2}-\frac{1}{6}\right) = \frac{4}{3}\cdot L^3 - 4\cdot L^2 + 4\cdot L - \frac{4}{3}$$

floating operations which, for big L, can be approximated by the cubic term $$\frac{4}{3}\cdot L^3.$$

The fact that this figure grows with the cube of the matrix dimension indicates that multi-processor solutions are required for real-time implementation.

In order to achieve a balanced partitioning of the processing load among a number P of processor modules over the whole processing period, according to the invention a pre-assignment of the computation of a set of rows to each processor module is defined. This should be done in such a way that at each step (=column), all processors are involved. According to the invention each of the processor modules has to compute the row entries for a number $$R=\frac{L}{P}$$

of rows.

Due to the (lower) triangular shape of the Cholesky factor, for each column i, only the row entries with indices i, . . . , L have to be determined. This means that the processor module to which the computation of row i is assigned will have one assigned row less to take care of once the entries of column i are completed. According to the invention the assignment of a given row to a processor module P(p=1, . . . , P) is such that j=p+(r−1)·P with r=1, . . . , R and p=1, . . . , P.

The following table shows in detail the associated row numbers for a given processor module:

| Processor Module | Associated row numbers |
|---|---|
| 1 | 1, 1+P, . . . , 1+(R−1)P |
| 2 | 2, 2+P, . . . , 2+(R−1)P |
| P−1 | (P−1), (P−1)+P, . . . , (P−1)+(R−1)P |
| P | P, P+P, . . . , P+(R−1)P=RP=L |

With this partitioning of the rows to the processor modules a balanced processing load among the processing modules throughout the whole processing time is guaranteed. The computational load for processor module p is obtained as follows:

First, as noted above, for the entry $a_{ji}$ $8i^2-8i$ and hence for all j entries of row j, $$8\cdot\sum_{i=1}^{j}(i^2-1) = \frac{8}{3}\cdot(j^3-2\cdot j^2-j) = \frac{8}{3}\cdot j\cdot(j-1)^2$$

operations. The total number of operation flops(p) for processor number p is obtained by summing the last expression over all values j=p+(r−1)·P with r=1, . . . , P:

$$\text{flops}(p) = \frac{8}{2}\cdot\left\{\sum_{r=1}^{R}(p+(r-1)\cdot P)\cdot(p+(r-1)\cdot P-1)^2\right\}.$$

This expression indicates that the processing load is well balanced between the P processor modules.

Concerning the data tansfer between the processor modules, according to the invention with the beginning of the iteration step for computing the entries of column i with i≦L, the processor module to which the computation of row number i is assigned stores its values of row i for access by the other processor modules.

In other words, according to the formulae for the computation of the entries of the Cholesky factor (eqn.(1)), the entries of a certain row number i, assigned to some processor module, have to be made available to the other processor modules at the iteration step when the entries of column number i are computed. This means that this processor unit has to transfer the computed values of row i at the end of the $(i-1)^{th}$ including the $i^{th}$(=diagonal) value which is the length of the row vector consisting of the (i−1) already computed values of the $i^{th}$ row.

This implies that at the end of each iteration step (=column) i, the processor module to which the computation of row number (i+1) is assigned has to transfer all its (i+1) values for availability to the other processor modules for the computation of the values of column number (i+1).

Other objects, advantages and novel features of the present invention will become apparent from the following detailed description of the invention when considered in conjunction with the accompanying drawings.

DETAILED DESCRIPTION OF THE DRAWING

Figure 1A:
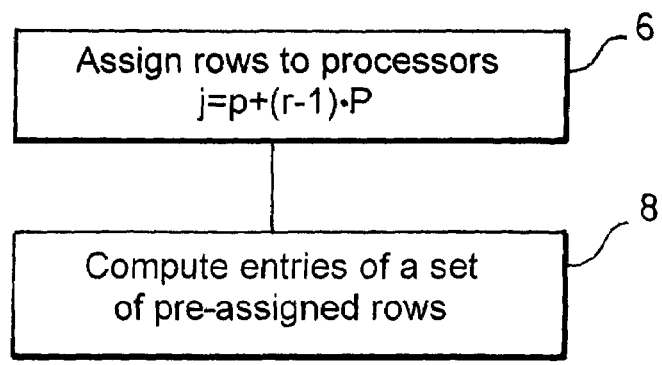
FIG. 1a shows the assignment of rows to processors and FIG. 1b shows a flow chart of the procedure for computing the Cholesky decomposition by means of an iteration process.
Figure 1B:
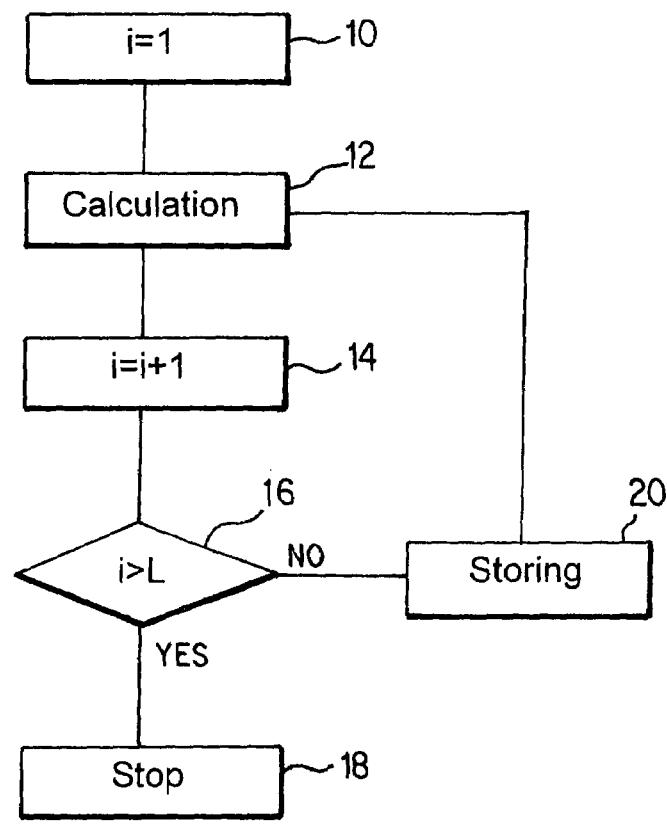

Referring to the FIGURE, the iteration process starts with calculation of the entries of column i=1 (step 10). Each processor module p computes the entries of column i for its assigned rows j according to eqn. (1) (step 12). In the next step (step 14), the counter of the column to be calculated is incremented by one. If the counter i is greater than the dimension L of the underlying covariance matrix to be Cholesky decomposed, the process will stop (steps 16 and 18). Otherwise, this processor module assigned to row j stores the values of row j for access by the other processor modules (step 20). The following step is the computation step described above of the entries of the given column.

With the resulting Cholesky factors of the Cholesky decomposition, a simple and efficient subsequent processing is possible. With the process according to the invention a semi-parallel implementation of the Cholesky decomposition on a multi-processor system is possible. Other advantages are:

- Utilization of a multi-processor architecture, which is required for other processing sub-tasks within the same overall task. Known procedures require an additional single processor unit which has to be very powerful in order to meet the requirements of modern systems in terms of maximal allowable latencies.
- Balanced workload between the processor units throughout the whole computation process.
- Data exchange is performed in an effective manner with minimal waiting time.
- Procedure does not require special data transfer or storage features.

By applying a procedure according to the invention, the computation of a Cholesky decomposition can be performed faster than on a system with a powerful single processor. For example, performing the computation of a Cholesky decomposition on a multi processor system consisting of 11 processors, the Cholesky decomposition of a covariance matrix of size 240×240 can be accomplished with latency time less than 3 ms. This is a factor 5–10 times faster than the implementation on a powerful single processor competing for the same application.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for computing a Cholesky decomposition of a positive definite matrix into a product of a lower and an upper triagonal matrix having a dimension of L in a multi-channel procedure, the process comprising the acts of:

performing the computation in a parallel multi-processor system comprising a number P of processor modules;

each processor module p computes the entries of a set R of rows of the lower triagonal matrix with R=L/P, whereby a given row j is assigned to a processor module p such that j=p+(r−1)·P with r=1..., R and p=1,..., P;

entries of the lower triagonal matrix are obtained by an iteration process over the columns i, with i=1,..., L, whereby in each iteration step each processor module computes the entries of column i for its assigned rows R;

upon beginning an iteration step for computing the entries of column i with i≦L, the processor module to which the computation of row number i is assigned, stores its values of row i for access by the other processor modules; and wherein the computation of entry $a_{ji}$ of column i and row j is given by $$a_{ji} = \|a_{i,i-1}\|^{-1} \cdot \left(c_{ij} - \sum_{k=1}^{i-1} a_{ik} \cdot a_{jk}^*\right)$$

with $c_{ij}$ being the corresponding value of the original matrix to be Cholesky decomposed, $\|a_{i,i-1}\|^{-1}$ being the length of the vector consisting of the already determined i−1 values of the $i^{th}$ row, and $a_{jk}^*$ denoting the complex conjugation.

* * * * *